Jan. 30, 1934.  H. S. EBERHARD  1,945,185
TRACTOR ATTACHMENT
Filed March 23, 1933  4 Sheets-Sheet 3
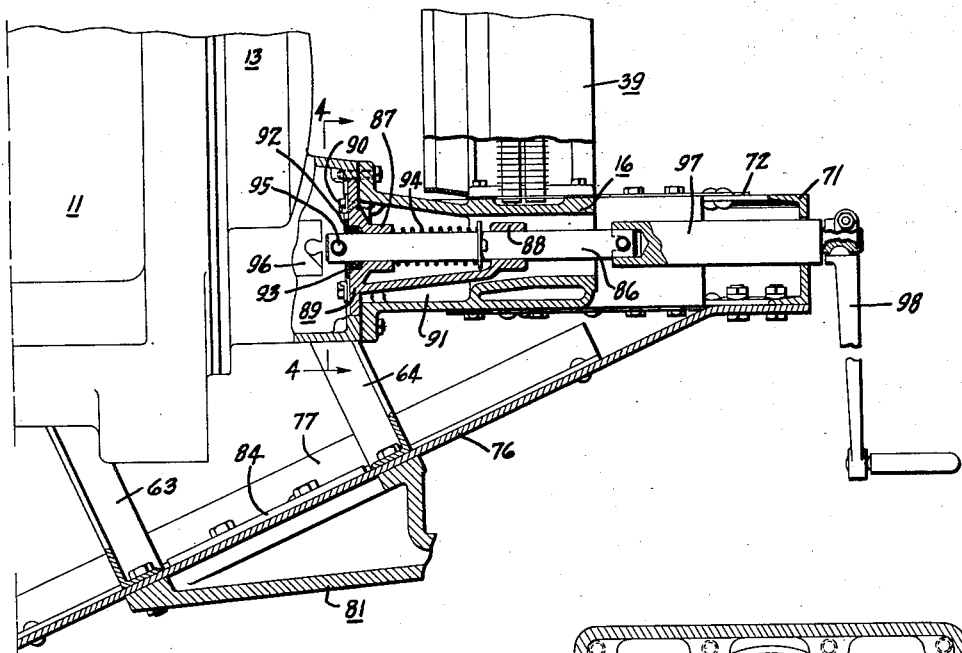
FIG-3-
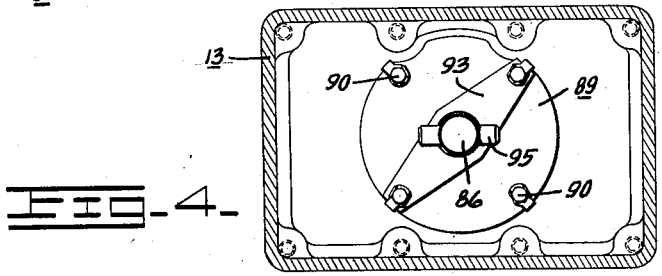
FIG-4-
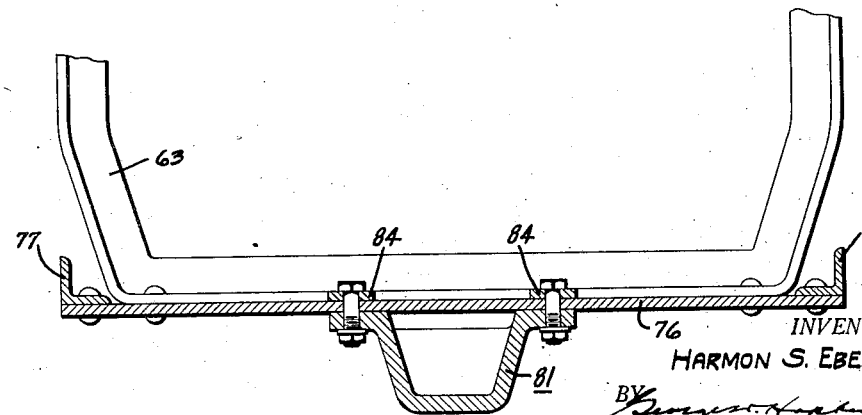
FIG-5-
INVENTOR.
HARMON S. EBERHARD
BY
ATTORNEY.

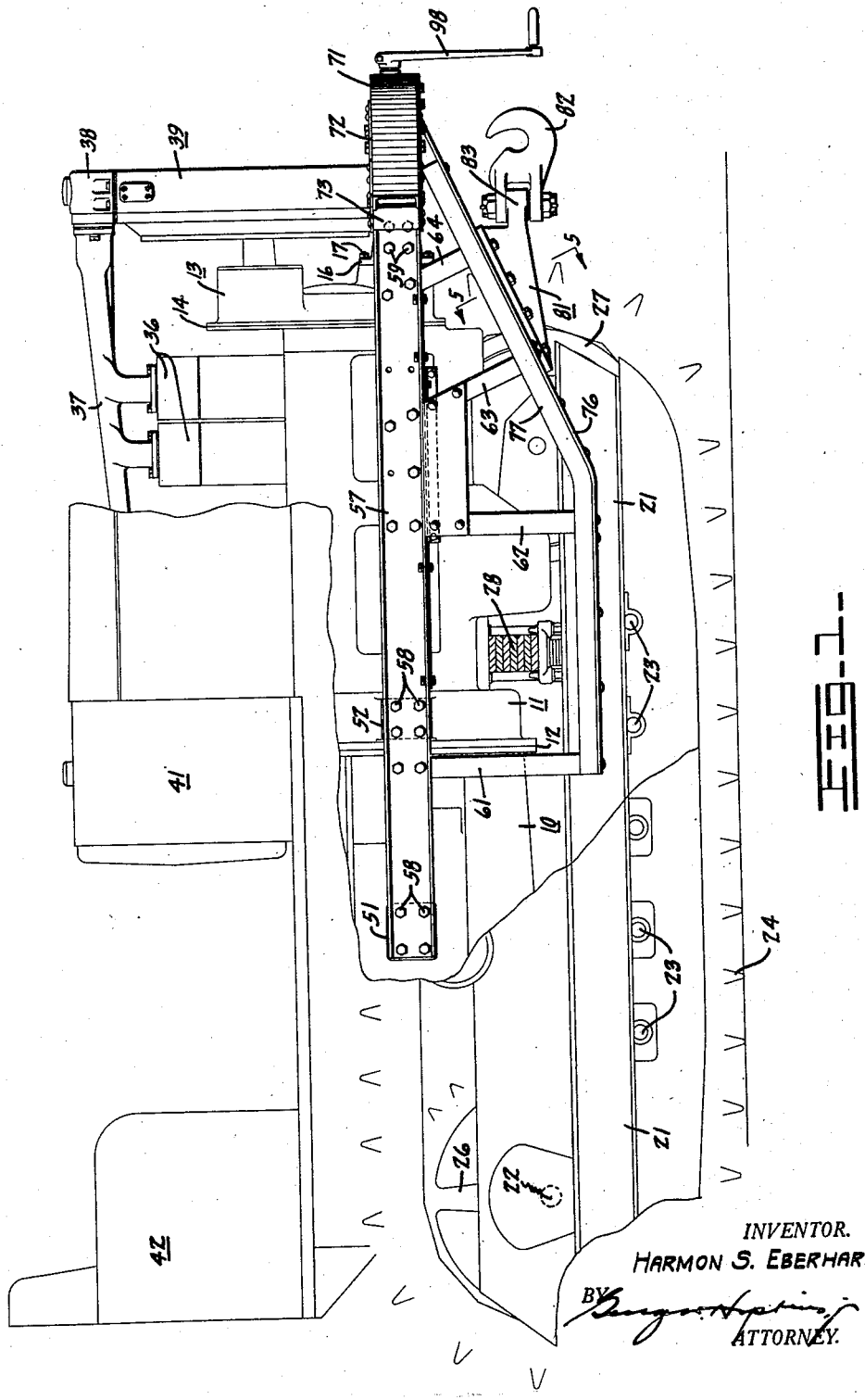

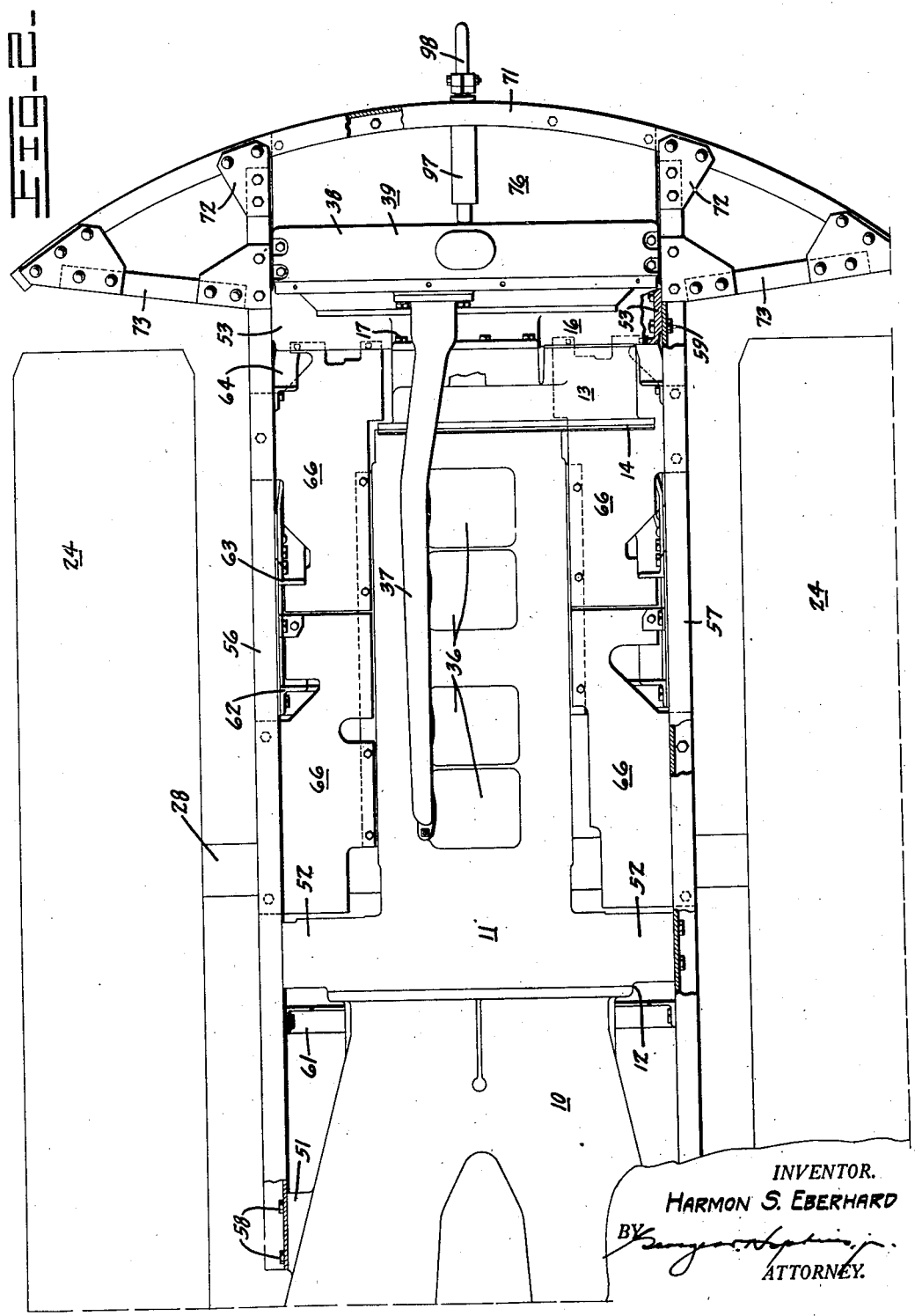

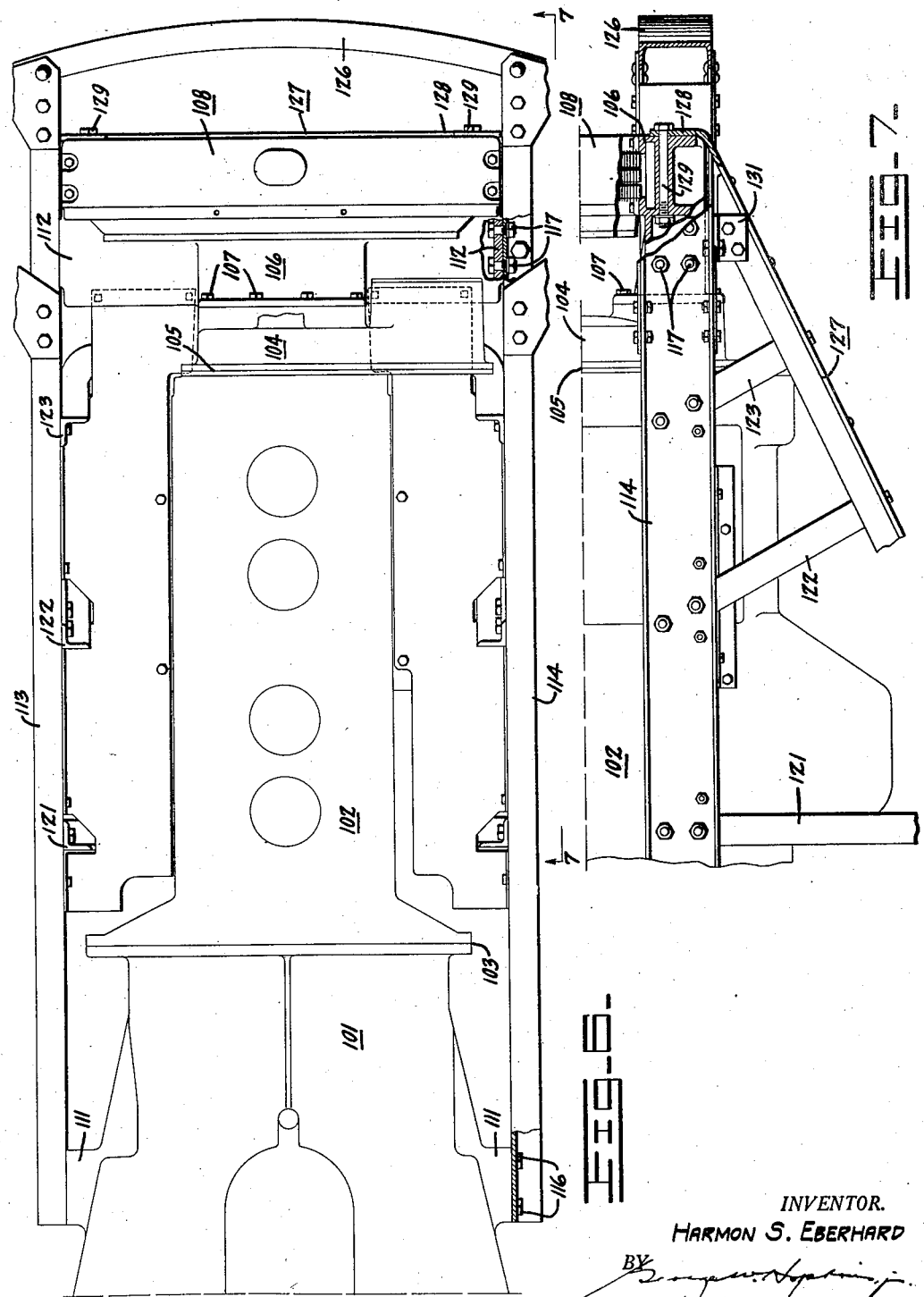

Patented Jan. 30, 1934

1,945,185

UNITED STATES PATENT OFFICE 1,945,185

TRACTOR ATTACHMENT

Harmon S. Eberhard, Peoria, Ill., assignor to Caterpillar Tractor Co., San Leandro, Calif., a corporation of California Application March 23, 1933. Serial No. 662,317

6 Claims. (Cl. 180—54)

The present invention relates to tractors and more particularly to the provision of auxiliary attachments therefor, and means for mounting such attachments thereon.

It is an object of the invention to provide means for readily and quickly attaching or removing an auxiliary attachment for a tractor.

Another object of the invention is to provide mounting means for attaching auxiliary equipment on a tractor.

Another object of the invention is to provide mounting stations on the frame of a tractor whereby an attachment may be installed easily thereon.

Another object of the invention is to provide a tractor having a frame proper and a radiator mounted thereon, said frame and said radiator having integral mounting stations for installing an auxiliary attachment on the tractor.

Another object of the invention is to provide an auxiliary attachment for equipping a tractor for operation in rough, rocky country.

Another object of the invention is to provide a tractor having a main frame comprising a plurality of united sections, and means for mounting an auxiliary attachment thereon whereby stresses from the attachment during operation are transmitted to a plurality of said sections.

Another object of the invention is to provide a tractor having a main frame including a radiator tank, said main frame being provided with spaced integral means for mounting an auxiliary attachment frame.

Another object of the invention is to provide a sturdy and simple radiator mounting in a tractor.

Another object of the invention is to provide mounting means for a radiator including an auxiliary frame which adapts the tractor for operation with special equipment.

Another object of the invention is to provide a starting crank mounting in a tractor, said crank having an extension for use when an auxiliary attachment is installed on a tractor.

Another object of the invention is to provide a starting crank mounting in a tractor which provides spaced bearing supports for the starting crank.

Other objects will appear as the description progresses.

Description of figures

Figs. 1 through 5 illustrate one form of the invention.

Fig. 1 is a right side elevation of the tractor with certain portions broken away to better disclose the auxiliary attachments and the mounting means therefor.

Fig. 2 is a plan view of the front end of the tractor with the auxiliary attachments mounted thereon.

Fig. 3 is a transverse longitudinal section taken on the axis of the starting crank.

Fig. 4 is a section taken on the line 4—4 in Fig. 3.

Fig. 5 is a section taken on the line 5—5 in Fig. 1.

Figs. 6 and 7 illustrate a modified form of the invention.

Fig. 6 is a partial plan view of the front end of the tractor.

Fig. 7 is a view taken on the line 7—7 in Fig. 6 with a portion of the attachment frame and the radiator broken away.

Description of mechanism

The tractor disclosed herein is of the track type and comprises generally a main frame which is pivotally and resiliently supported on a pair of endless track mechanisms. The main frame includes a transmission case, a crankcase joined thereto, a timing gear housing secured to the front of the crankcase, and a bottom radiator tank secured to the front of the timing gear housing. Each endless track mechanism includes a track roller frame on which a plurality of track rollers are mounted which run upon the ground stretch of the endless track and transmit the weight of the tractor thereto. The tractor is propelled over the tracks by driving sprockets mounted at the rear of the track roller frames, the tracks passing over said sprockets and front idlers mounted at the front of the track roller frames.

The main frame (Figs. 1 and 2), or body portion of the tractor, comprises transmission case 10, crankcase 11 joined thereto at 12, timing gear housing 13 joined to crankcase 11 at 14, and bottom radiator tank 16 secured to housing 13 by bolts 17. Said main frame has aligned pivotal connections with the endless track mechanisms, each of which comprises a track roller frame 21 (Fig. 1) pivotally connected to transmission case 10 about the axis of a shaft 22, indicated in dotted lines in Fig. 1. A plurality of track rollers are mounted on shafts 23 on each track roller frame 21, and bear upon the ground stretch of track 24, indicated schematically in said figure. Track 24 passes over final drive sprocket 26 mounted on transmission case 10 and a front idler 27 mounted at the front end of each track roller frame 21.

The front end of the main frame is resiliently supported on the track roller frames by equalizer bar 28 engaging under crankcase 11 and having its ends resting on track roller frames 21. Thus, a tractor main frame which comprises a plurality of detachably connected sections is supported on a pair of endless track mechanisms which have a limited oscillatory movement with respect thereto, whereby the tractor can travel over rough, uneven ground.

The tractor engine in addition to the crankcase, timing gear housing, and bottom radiator tank, heretofore described, includes a cylinder assembly comprising a plurality of individual cylinders mounted on the crankcase and connected by a water manifold to the top of the radiator tank, whereby the water manifold together with the timing gear housing provides mounting means for the radiator on the engine. Cylinders 36 (Figs. 1 and 2) are connected by water manifold 37 to top tank 38 of radiator 39. Fuel tank 41 for the engine is mounted to the rear thereof above connection 12 and closes the front of the operator's compartment where seat 42 is located.

The tractor is equipped with means for mounting auxiliary attachments thereon, such means comprising mounting stations or pads formed integrally on the transmission case, the crankcase, and the bottom radiator tank, together with a frame secured to the mounting stations. The auxiliary attachments disclosed herein include a bumper, a crankcase guard, and drawbar means comprising a front pull hook, said attachments adapting the tractor for operation in logging and like work. As the auxiliary frame extends along the sides of, and engages the main frame, said auxiliary frame and the attachments thereon are located between the tracks.

The mounting stations comprise opposite similar pads 51 integrally formed on transmission case 10, opposite similar pads 52 integrally formed on crankcase 11 adjacent connection 12, and opposite similar pads 53 integrally formed on bottom radiator tank 16. All of said pairs of opposite pads are formed to receive securing means whereby an auxiliary frame can be attached thereto.

The auxiliary attachment frame includes longitudinal side channels 56, 57 which engage respective pads of said opposite pairs and are secured to pads 51, 52 by screws 58, and to pads 53 by bolts 59. The auxiliary frame also includes U-shaped cross members 61, 62, 63, 64 (Figs. 1 and 5) having their ends detachably connected to said channels 56, 57, respectively. The space between the auxiliary frame and crankcase 11 (Fig. 2) is closed by a plurality of plates 66 secured to said crankcase and to side channels 56, 57. Said auxiliary frame not only provides mounting means for a plurality of attachments for the tractor, but also serves to brace radiator 39, and may be considered as forming a part of the mounting means therefor. It is to be noted that any stresses transmitted from an attachment to the auxiliary frame are distributed between the transmission case, the crankcase, and the bottom radiator tank, that is, to the various sections of the main frame.

One of the attachments secured to said auxiliary frame comprises bumper 71 (Figs. 1 and 2) connected by gussets 72 to the front ends of side channels 56, 57, and the ends of said bumper are braced by opposite angles 73 secured to the ends of said bumper and to side channels 56, 57 by suitable gussets. A second attachment mounted on the tractor by means of said auxiliary frame is crankcase guard 76 (Figs. 1 and 5) riveted to said cross members 61, 62, 63, 64, which bends upwardly at its forward end and is attached to bumper 71. Stiffening angles 77 are riveted along the longitudinal edges of said guard 76. A third attachment on said auxiliary frame comprises a front pull hook including bracket 81 detachably secured to the under side of the forward inclined portion of guard 76 and hook 82 pivoted on said bracket at 83. Stiffening strips 84 (Figs. 3 and 5) are placed on the upper side of guard 76.

When the above-described attachments are installed on the tractor, the starting crank, which is mounted within the bottom radiator tank by a bracket providing spaced bearing supports therefor, is provided with an extension whereby the crank proper is positioned forwardly of the bumper. The mounting bracket for the starting crank closes the rear opening of the passage in the bottom radiator tank and provides sealing means for preventing the entry of deleterious matter to the crankcase in addition to supporting the starting crank which extends through the passage. Starting crank shaft 86 (Fig. 3) is mounted in bearings 87, 88 of bracket 89 which is secured to the rear face of radiator tank 16 by screws 90 (Figs. 3 and 4), said bracket closing the rear opening of passage 91 in tank 16. Seal 92 is seated in bracket 89 and engages shaft 86, being held in place by retainer 93 (Fig. 4) to further insure against entry of foreign material into the crankcase. Spring 94 (Fig. 3) on shaft 86 is compressed between bearing 87 and a suitable washer on said shaft to resiliently maintain said shaft in its inoperative position where pin 95 in the rear end thereof is disengaged from front end 96 of the engine crankshaft. The front end of shaft 86 has a driving connection with shaft extension 97 having crank proper 98 secured on the front end thereof.

Thus, an extension is provided for the starting crank when auxiliary attachments are installed on the tractor, and the starting crank shaft is provided with spaced bearing supports within the bottom radiator tank, sealing means being provided to prevent the entry of deleterious material through the passage in said tank into the crankcase.

Figs. 6 and 7 illustrate a modified form of the invention. The tractor construction is generally similar to that heretofore described, and the main frame of the tractor includes transmission case 101, crankcase 102 secured thereto at 103, timing gear housing 104 secured to crankcase 102 at 105, and bottom radiator tank 106 secured to timing gear housing 104 by screws 107. Radiator 108 is mounted on bottom tank 106 at the front of the engine, said tank providing the entire support therefor. Thus, it is seen that in both forms of the invention the main frame comprises a plurality of sections joined together, and the main frame proper, comprising the transmission case, crankcase, and timing gear housing, has the bottom radiator tank detachably secured thereto.

Mounting stations are provided on the frame for an auxiliary frame which provides means for mounting auxiliary attachments on the tractor. The mounting means include similar opposite pads 111 on transmission case 101, similar opposite pads 112 on bottom radiator tank 106, and side channels 113, 114 of the auxiliary frame engaging said pads 111, 112 and secured thereto by screws 116 and bolts 117, respectively. Said side channels 113, 114 not only serve to support attachments for the tractor but also brace radiator 108, and may be considered part of the mounting means therefor. U-shaped cross members 121, 122, 123, similar to members 61-64, have their ends secured to respective channels 113, 114.

The attachments on the auxiliary frame include bumper 126, similar to bumper 71 and similarly mounted, and crankcase guard 127 secured to cross members 121, 122, 123 and inclined upwardly at the front, terminating in vertical portion 128 which is secured to bottom radiator tank 106 by bolts 129. Similar brackets 131 (Fig. 7) connect guard 127 to side channels 113, 114, only one of said brackets being shown in Fig. 7.

From the foregoing description, it is seen that in both forms of the invention the main frame comprises a plurality of sections detachably connected together, certain of which are provided with integral pads adapted to receive securing means for attaching an auxiliary frame thereto, the auxiliary frame and said pads providing mounting means for attachments to the tractor.

I, therefore, claim as my invention:

1. In a tractor, a main frame, comprising a transmission case, a crankcase, a timing gear housing, and a radiator tank secured together; opposite pads on the sides of said transmission case, opposite pads on the sides of said tank, said pads being formed to receive securing means; an auxiliary frame, comprising opposite side members extending along said main frame and engaging said pads, and longitudinally spaced, U-shaped cross members connecting said side members; means for securing said side members to said pads, a bumper secured to the front ends of said side members extending across said main frame and spaced in front of said radiator, and a guard secured to said cross members for protecting said crankcase.

2. In a tractor, a main frame proper comprising a transmission case, and a crankcase, a radiator mounted on said frame, opposite mounting stations on said transmission case and said radiator; an auxiliary frame secured to said stations, comprising side members extending along opposite sides of said main frame, and cross members connecting said side members; a bumper detachably mounted on said auxiliary frame in front of and spaced from said radiator, and a guard detachably mounted on said auxiliary frame and having an end secured to said radiator.

3. In a tractor, a main frame proper comprising a transmission case, and a crankcase, a radiator mounted on said frame, opposite mounting stations on said transmission case, said crankcase, and said radiator; an auxiliary frame detachably secured to said stations, comprising side members extending along opposite sides of said main frame and cross members connecting said side members; a bumper detachably mounted on said auxiliary frame, a guard detachably mounted on said auxiliary frame extending beneath said crankcase, and drawbar means detachably mounted on said guard.

4. In a tractor, a main frame proper comprising a transmission case, and a crankcase, a radiator mounted on said frame, opposite mounting stations on said transmission case, said crankcase, and said radiator; an auxiliary frame detachably secured to said stations, comprising side members extending along opposite sides of said main frame and cross members connecting said side members; a bumper detachably mounted on said auxiliary frame, a guard detachably mounted on said auxiliary frame extending beneath said crankcase, said guard having its front end secured to said bumper, and drawbar means mounted on said guard.

5. In a tractor, a main frame, comprising a transmission case, a crankcase, a timing gear housing, and a radiator tank joined together, said housing and said tank having adjacent conforming openings; an attachment for said tractor comprising an auxiliary frame encompassing said main frame and secured thereto, and a bumper secured to said auxiliary frame and extending across the front of said main frame, being spaced from said tank; a crankshaft having an end extending within said timing gear housing, a shaft engageable with said crankshaft, means for mounting said shaft in said tank comprising a bracket closing the rear opening in said tank and extending therein to provide spaced bearing supports for said shaft, an extension for said shaft engageable therewith and extending through said bumper, and a crank on the front end of said extension.

6. In a tractor, a timing gear housing, and a radiator tank joined together, said housing and said tank having adjacent conforming openings; a crankshaft having an end extending within said timing gear housing, a shaft engageable with said crankshaft, and means for mounting said shaft in said tank comprising a bracket closing the rear opening in said tank and extending therein to provide spaced bearing supports for said shaft.

HARMON S. EBERHARD.